United States Patent
Barsness et al.

(10) Patent No.: US 9,720,579 B2
(45) Date of Patent: *Aug. 1, 2017

(54) PROCESSING ELEMENT PLACEMENT TOOL

(71) Applicant: International Business Machines Corporation, Armonk, NY (US)

(72) Inventors: Eric L. Barsness, Pine Island, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,520

(22) Filed: Dec. 6, 2016

(65) Prior Publication Data
US 2017/0083199 A1    Mar. 23, 2017

Related U.S. Application Data

(63) Continuation of application No. 15/266,715, filed on Sep. 15, 2016, which is a continuation of application No. 14/978,062, filed on Dec. 22, 2015, now Pat. No. 9,459,757, which is a continuation of application No.
(Continued)

(51) Int. Cl.
*G06F 3/048*      (2013.01)
*G06F 3/0484*     (2013.01)
*G06F 9/445*      (2006.01)

(52) U.S. Cl.
CPC .............. *G06F 3/0484* (2013.01); *G06F 8/65* (2013.01)

(58) Field of Classification Search
CPC .......... G06F 3/00; G06F 3/048; G06F 3/0481; G06F 3/0484; G06F 9/4401; G06F 9/4443; G06F 15/16; G06F 15/173; G06Q 10/10; H04L 12/24; H04L 12/911; H04L 41/12; H04L 41/22; H04L 29/06; H04L 29/08; H04L 29/021; H04L 29/06027; H04L 29/08072; H04L 29/08144
See application file for complete search history.

(56) References Cited

U.S. PATENT DOCUMENTS

| | | |
|---|---|---|
| 6,516,350 B1 | 2/2003 | Lumelsky et al. |
| 7,478,352 B2 | 1/2009 | Chaplin et al. |
| 8,018,614 B2 | 9/2011 | Bansal et al. |

(Continued)

OTHER PUBLICATIONS

IBM, "Infosphere Streams Studio", IBM developerWorks, May 5, 2015, Last accessed Dec. 21, 2015. 6 pages. https://developer.ibm.com/streamsdev/docs/streams-studio-overview/.
(Continued)

*Primary Examiner* — Xiomar L Bautista
(74) *Attorney, Agent, or Firm* — Stosch Sabo

(57) ABSTRACT

A method, system, and computer program product for selectively associating one or more processing elements, or portions thereof, to one or more compute nodes. The method, system, and computer program product can include presenting a stream computing application, presenting metrics associated with at least one compute node and at least one processing element (or portion thereof), receiving input from a graphical display, associating one or more processing elements (or portions thereof) to one or more compute nodes, and updating the graphical display and the metrics to reflect the selective associations.

1 Claim, 4 Drawing Sheets

Related U.S. Application Data

14/809,453, filed on Jul. 27, 2015, now Pat. No. 9,531,602.

(56) References Cited

U.S. PATENT DOCUMENTS

| | | |
|---|---|---|
| 8,286,191 B2 | 10/2012 | Amini et al. |
| 8,291,325 B2 | 10/2012 | Arnstein |
| 8,478,800 B1 | 7/2013 | Johnson et al. |
| 8,732,300 B2 | 5/2014 | Barsness et al. |
| 8,898,505 B2 | 11/2014 | Fawcett |
| 8,990,628 B2 | 3/2015 | Branson et al. |
| 9,298,788 B1 | 3/2016 | Kekre et al. |
| 9,459,757 B1 | 10/2016 | Barsness et al. |
| 2006/0095894 A1 | 5/2006 | Wilde et al. |
| 2009/0132335 A1 | 5/2009 | Pein |
| 2012/0047467 A1 | 2/2012 | Pfeifer et al. |
| 2012/0179809 A1 | 7/2012 | Barsness et al. |
| 2012/0259910 A1 | 10/2012 | Andrade et al. |
| 2013/0080600 A1 | 3/2013 | Santosuosso et al. |
| 2014/0059212 A1 | 2/2014 | Gedik et al. |
| 2014/0365597 A1 | 12/2014 | Boehmer et al. |
| 2015/0081693 A1 | 3/2015 | Branson et al. |

OTHER PUBLICATIONS

Gedik, et al., "A model-based framework for building extensible, high performance stream processing middleware and programming language for IBM InfoSphere Streams", Software-Practice and Experience, 2012; 42:136√ 1391. Published online Nov. 13, 2011 in Wiley Online Library (wileyonlinelibrary.com). DOI: 10.1002/spe.1139 Copyright © 2011 John Wiley & Sons, Ltd. 29 pages.

Zhou, et al, "Resolve hotspots and load imbalance problem in Event Stream Processing System", 2013 International Conference on Cloud and Service Computing (CSC). DOI: 10.1109/CSC.2013.34 2 pages. © 2013 IEEE.

Zhou, et al., "Using paralleled-PEs method to resolve the bursting data in distributed stream processing system", 2013 IEEE 16th International Conference on Computational Science and Engineering. DOI 10.1109/CSE.2013.196 8 pages. © 2013 IEEE.

List of IBM Patents or Patent Applications Treated as Related, Dec. 5, 2016. 2 pages.

Barsness et al., "Processing Element Placement Tool", U.S. Appl. No. 14/809,453, filed Jul. 27, 2015.

Barsness et al., "Processing Element Placement Tool", U.S. Appl. No. 15/266,715, filed Sep. 15, 2016.

U.S. Appl. No. 15/266,715, Accelerated Examination Search Document, Sep. 13, 2016. 8 pages.

U.S. Appl. No. 14/978,062, Accelerated Examination Search Document, Mar. 14, 2015. 7 pages.

PROCESSING ELEMENT PLACEMENT TOOL

BACKGROUND

This disclosure generally relates to stream computing, and in particular, to deploying stream computing applications in a computing infrastructure.

Stream computing applications are composed of processing elements, which are in turn composed of stream operators. The various processing elements and stream operators associated with a stream computing application can be executed by one or more compute nodes.

SUMMARY

Aspects of the present disclosure are directed toward a computer implemented method for managing a deployment of a stream computing application in a computing infrastructure. In certain embodiments, the method can include generating a graphical user interface display presenting the stream computing application and the computing infrastructure. The stream computing application can include one or more processing elements. Each processing element can include one or more stream operators. The computing infrastructure can include one or more compute nodes. The method can include displaying a respective metric for each presented processing element and each presented compute node. The method can include allocating at least a portion of a processing element to at least one compute node using input received from the graphical user interface. The method can include updating, in response to each respective allocation, the graphical user interface display to execute the at least a portion of a processing element on the at least one compute node. The method can include updating, in response to each allocation, each metric for each presented processing element and compute node.

Aspects of the present disclosure, in certain embodiments, are directed toward a system for managing a stream computing application. In certain embodiments, the system is made up of a computing infrastructure containing a plurality of compute nodes, where each compute node comprises a processor and a memory. The computing infrastructure may be configured to execute the processing elements of a stream computing application. The system may include a user interface configured to receive respective associations based on a user input, wherein each respective association contains at least a portion of a processing element and one or more compute nodes. The system may include a development system operably coupled to the computing infrastructure and the user interface, where the development system can contain at least a processor and a memory. The memory can contain a stream computing application and a stream manager. The stream manager, when executed by the processor, may associate processing elements of the stream computing application to compute nodes of the computing infrastructure using input from the user interface. The operation of the processor may cause the processor to generate a graphical display presenting an operator graph containing at least a portion of the processing elements in the stream computing application and at least a portion of the compute nodes in the computing infrastructure. The operation may further include presenting at least one metric for each respective processing element and each respective compute node. The operation may further include receiving, from the user interface, each respective association, and updating, in response to each respective association, the operator graph to execute at least a portion of a processing element to one or more compute nodes based on the association. The operation may further include updating, in response to each association, at least one metric for each processing element and compute node.

Aspects of the present disclosure, in certain embodiments, are directed toward a computer program product for managing deployment of a stream computing application in a computing infrastructure. The computer program product may include a computer readable storage medium having program instructions embodied therewith, where the program instructions are executable by a processor. The processor may generate a graphical user interface display presenting an operator graph containing representations of processing elements of the stream computing application, relationships between the processing elements of the stream computing application, at least one compute node associated with the computing infrastructure, and relationships between the processing elements of the stream computing application and the at least one compute node of the computing infrastructure. The processor may calculate at least one performance metric for each compute node and each processing element. The processor may allocate at least a portion of one or more processing elements to one or more compute nodes using input received from the graphical user interface display. The processor may recalculate, in response to each allocation, the at least one performance metric for each respective compute node and processing element. The processor may update, in response to each allocation, the operator graph to execute at least a portion of one or more processing elements to one or more compute nodes.

BRIEF DESCRIPTION OF THE DRAWINGS

The drawings included in the present application are incorporated into, and form part of, the specification. They illustrate embodiments of the present disclosure and, along with the description, serve to explain the principles of the disclosure, the drawings are only illustrative of certain embodiments and do not limit the disclosure.

Figure 1:
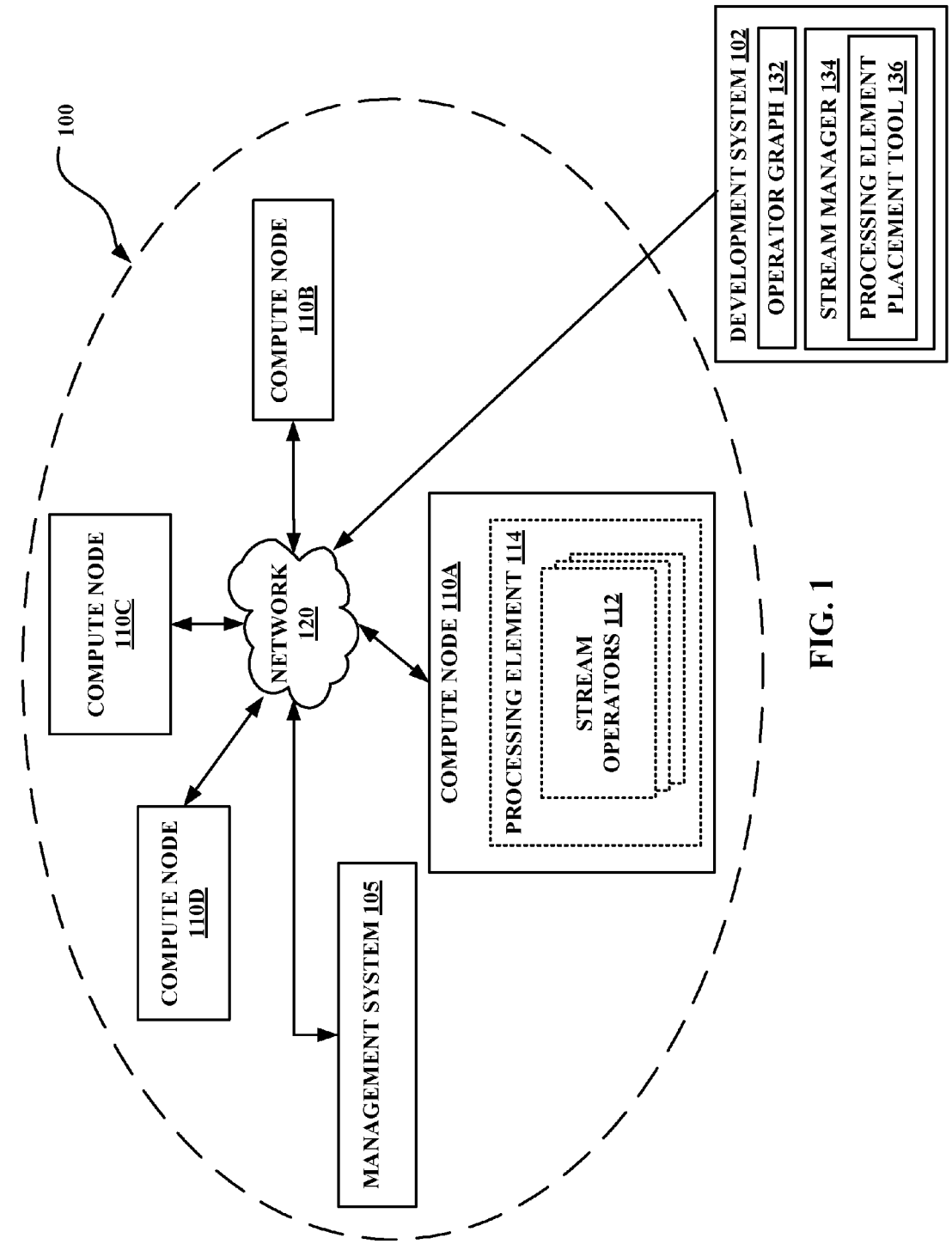
FIG. 1 illustrates a computing infrastructure configured to execute a stream computing application according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to stream computing applications, more particular aspects relate to associating processing elements to compute nodes. While the present disclosure is not necessarily limited to such applications, various aspects of the disclosure may be appreciated through a discussion of various examples using this context.

A stream computing application manipulates a continuous or quasi-continuous flow of data referred to as a series of individual "tuples." Stream computing applications contain at least one stream operator which manipulates at least one attribute of each tulle. Stream operators can be combined to form processing elements which are executed by computer resources (e.g., compute nodes). The compute node associated with a given processing element receives one or more streams of tuples, manipulates the tuples according to the stream operators contained within the processing element, and outputs one or more streams of modified tuples.

As is understood by one skilled in the art, stream operators are connected to one another such that data flows from one stream operator to the next (e.g., over a TCP/IP socket). When a stream operator receives data, it performs operations, such as analysis logic, which change the tulle by adding or subtracting attributes, or updating the values of existing attributes within the tulle. When the analysis logic is complete, a new tulle is then sent to the next stream operator. Stream operators in a stream computing application can be fused together to form a processing element that is executable. Doing so allows processing elements to share a common process space, resulting in faster communication between stream operators than is available using inter-process communication techniques (e.g., using a TCP/IP socket). Stream operators in the same operator graph can be hosted on different nodes (e.g., on different compute nodes or on different cores of a compute node). A stream computing application is deployed by creating processing elements and distributing and/or replicating them across multiple compute nodes and load balancing among the various processing element and compute node associations.

Data flows from one stream operator to another in the form of a tuple. A tuple is a sequence of one or more attributes associated with an entity. Attributes can be any of a variety of different types (e.g., integer, float, Boolean, string, etc.). In some cases, the attributes are ordered. In addition to attributes, a tuple can include metadata (i.e., data about the tuple). A tuple can be extended by adding one or more additional attributes or metadata to it. As used herein, "stream" or "data stream" refers to a sequence of tuples. Generally, a stream can be considered a pseudo-infinite sequence of tuples.

The flow of tuples through processing elements executed on a compute node is associated with compute node resource usage. The resource usage can include, but is not limited to, memory, storage, and/or processor usage. In instances where a processing element exceeds the resources of a given compute node, the stream computing application fails or its performance is degraded. Thus, strategically coupling processing elements to compute nodes decreases the risk of overloading one or more compute nodes and interrupting, delaying, or failing a stream computing application.

Referring now to the drawings, FIG. 1 illustrates one exemplary computing infrastructure 100 that can be configured to execute a stream computing application, according to some embodiments. The computing infrastructure 100 includes a management system 105 and two or more compute nodes 110A-110D (i.e., hosts) which are communicatively coupled to each other using one or more communications networks 120. The communications network 120 includes one or more servers, networks, or databases and uses a particular communication protocol to transfer data between the compute nodes 110A-110D (also referred to hereinafter collectively as compute node(s) 110). A development system 102 is communicatively coupled with the management system 105 and the compute nodes 110 either directly or via the communications network 120. According to some embodiments, the development system 102 is, in whole or in part, an integrated development environment (IDE).

The communications network 120 includes one or more types of physical communication channels or "links." The links are, for example, wired, wireless, optical, or any other suitable media. In addition, the communications network 120 includes a variety of network hardware and software for performing routing, switching, and other functions. The communications network 120 can be either dedicated for use by a stream computing application or shared with other applications and users. According to various embodiments, the communications network 120 includes a single local area network or a wide area network such as the Internet.

Each compute node 110 includes, without limitation, one or more processors (CPUs), a network interface, an interconnect, a memory, and a storage. One or more compute nodes 110A-110D implement the instructions of various stream operators 112. The stream operators 112 can be fused into one or more processing elements 114. Each stream operator 112 includes a portion of code that processes tuples flowing into a processing element and outputs tuples to other stream operators 112 in the same processing element, in other processing elements, or in both the same and other processing elements for a given stream computing application. Processing elements 114 pass tuples to other processing elements that are on the same compute node or on other compute nodes that are accessible via communications network 120.

The management system 105 includes, without limitation, one or more processors (CPUs), a network interface, an interconnect, a memory, and a storage. The management system 105 can also include an I/O device interface connecting I/O devices (e.g., keyboard, display, and mouse devices) to the management system 105. In some cases, the management system 105 will contain an operator graph and a stream manager similar to the operator graph 132 and stream manager 134 included in the development system 102. The management system 105 facilitates execution of a stream computing application by automating operations such as, but not limited to, load balancing, processing element distribution, and performance metric retrieval. In some embodiments of the present disclosure, the management system 105 conducts automated actions which facilitate execution of a stream computing application while the development system 102 conducts user-defined actions which facilitate execution of a stream computing application.

The development system 102 contains an operator graph 132 and a stream manager 134. The stream manager 134 contains a processing element placement tool 136. The development system 102 is operably coupled to one or more I/O devices (e.g., keyboard, display, and mouse devices). In some embodiments, the stream manager 134 creates processing elements 114 by fusing and unfusing stream operators 112 and associates processing elements 114 to compute nodes 110. In some embodiments, the processing element placement tool 136 associates processing elements 114 to compute nodes 110 based on user input. In various embodiments, the stream manager 134 functions autonomously, as a result of input from one or more I/O devices, or a combination of both. The operator graph 132 presents a visual representation of processing elements and/or stream operators and the associations between said processing elements and/or stream operators according to a given stream computing application. In some embodiments, the operator graph 132 additionally displays compute nodes associated with a given computing infrastructure and the relationships between compute nodes, processing elements, and/or stream operators.

Figure 2:
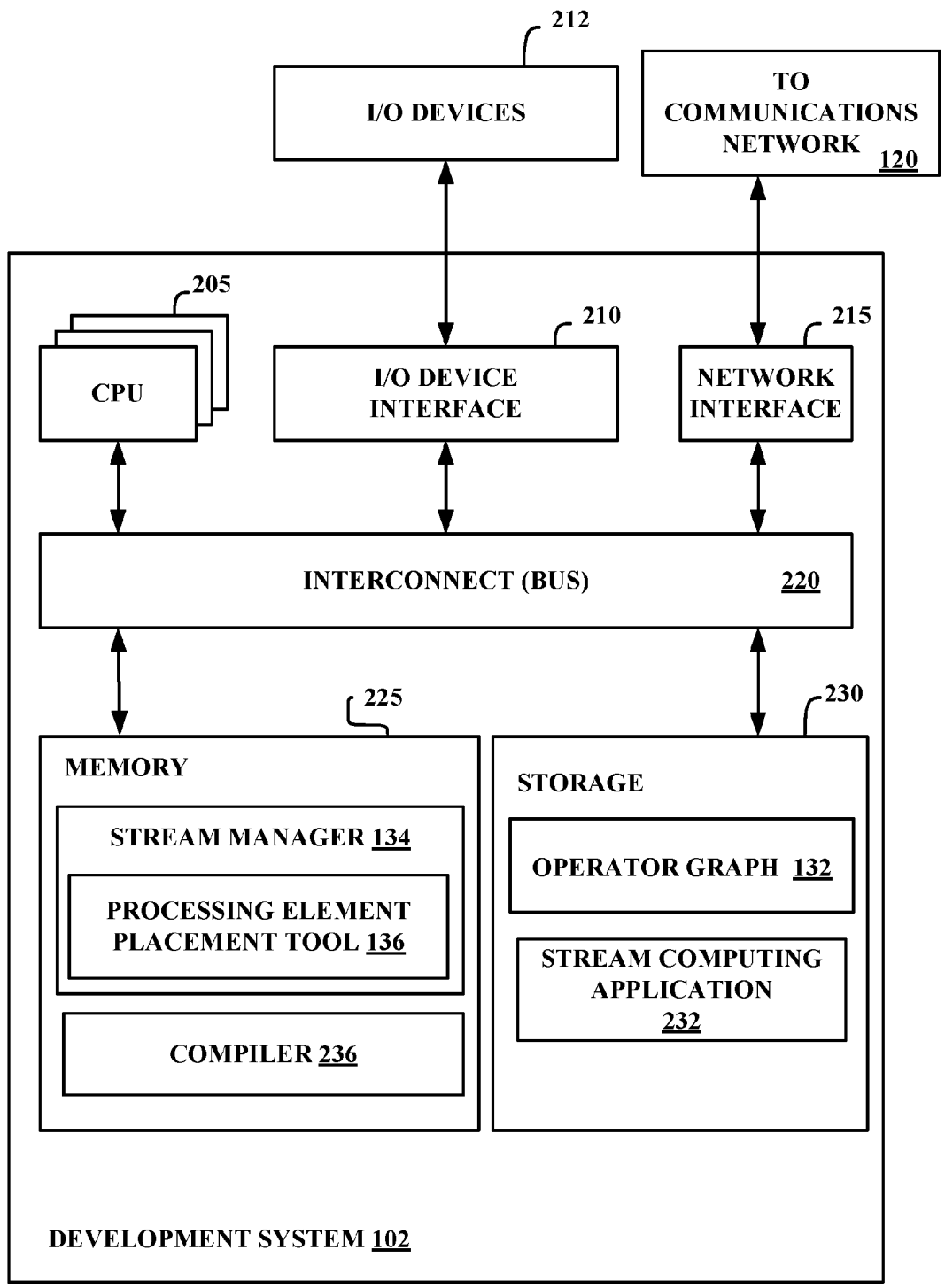
FIG. 2 illustrates a more detailed view of the development system of FIG. 1 according to various embodiments.

FIG. 2 is a more detailed view of the development system 102 of FIG. 1 according to some embodiments. The development system 102 can include, without limitation, one or more processors (CPUs) 205, a network interface 215, an interconnect 220, a memory 225, and storage 230. The development system 102 can also include an I/O device interface 210 connecting I/O devices 212 (e.g., keyboard, display, and mouse devices) to the development system 102.

Each CPU 205 retrieves and executes programming instructions stored in the memory 225 or storage 230. Similarly, each CPU 205 stores and retrieves application data residing in the memory 225 or storage 230. The interconnect 220 is used to move data, such as programming instructions and application data, between the CPU 205, I/O device interface 210, storage unit 230, network interface 215, and memory 225. According to various embodiments, the interconnect 220 is one or more busses. The CPUs 205 are a single CPU, multiple CPUs, or a single CPU having multiple processing cores in various embodiments. In one embodiment, a processor 205 is a DSP. Memory 225 is generally representative of a random access memory (e.g., SRAM, DRAM, or Flash). The storage 230 is generally representative of a non-volatile memory, such as a hard disk drive, solid state device (SSD), removable memory cards, optical storage, or flash memory devices. Alternatively, the storage 230 uses network attached storage (NAS), connections to storage area-network (SAN) devices, or to the cloud. The network interface 215 is configured to transmit data via the communications network 120.

The development system 102 includes one or more stream computing applications 232. The stream computing application 232 is stored in memory 225, storage 230, or a combination of both memory 225 and storage 230. In some embodiments, the stream computing application contains a plurality of pre-defined processing elements where each processing element contains a plurality of pre-defined stream operators. In embodiments having pre-defined processing elements or pre-defined stream operators, those processing elements and/or stream operators can be distributed to compute nodes as further articulated with respect to FIG. 3. The stream computing application contains additional information associated with the functioning of the stream computing application, such as, for example, encoded instructions defining which compute node executes a given processing element. The storage 230, memory 225, or a combination of both storage 230 and memory 225 can also contain an operator graph 132. In various embodiments the operator graph 132 uses information from the stream computing application 232 and the stream manager 134 to generate a visual display presenting the stream operators, processing elements, and relationships between stream operators and processing elements associated with the stream computing application 232.

The memory 225 stores a stream manager 134. The stream manager 134 stores a processing element placement tool 136. According to some embodiments, the stream manager 134 allows a user to define various aspects of a stream computing application execution. In one exemplary aspect, the processing element placement tool 136 provides instructions executable by a processor 205 to associate processing elements 114 to compute nodes 110 based on user inputs. In some embodiments the processing element placement tool 136 can also provide instructions to a processor 205 to modify processing elements 114 by fusing and unfusing stream operators 112 based on user input.

Additionally, the memory 225 stores a compiler 236. The compiler 236 outputs a set of deployable artifacts that includes a set of processing elements and an application description language file (ADL file), which is a configuration file that describes the stream computing application. The compiler 236 also generates program instructions to permanently or temporarily encode processing element and compute node associations to the stream computing application 232.

In various embodiments, the compiler 236 performs peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. In some cases, the output of the compiler 236 can be represented by an operator graph (e.g., the operator graph 132).

Figure 3:
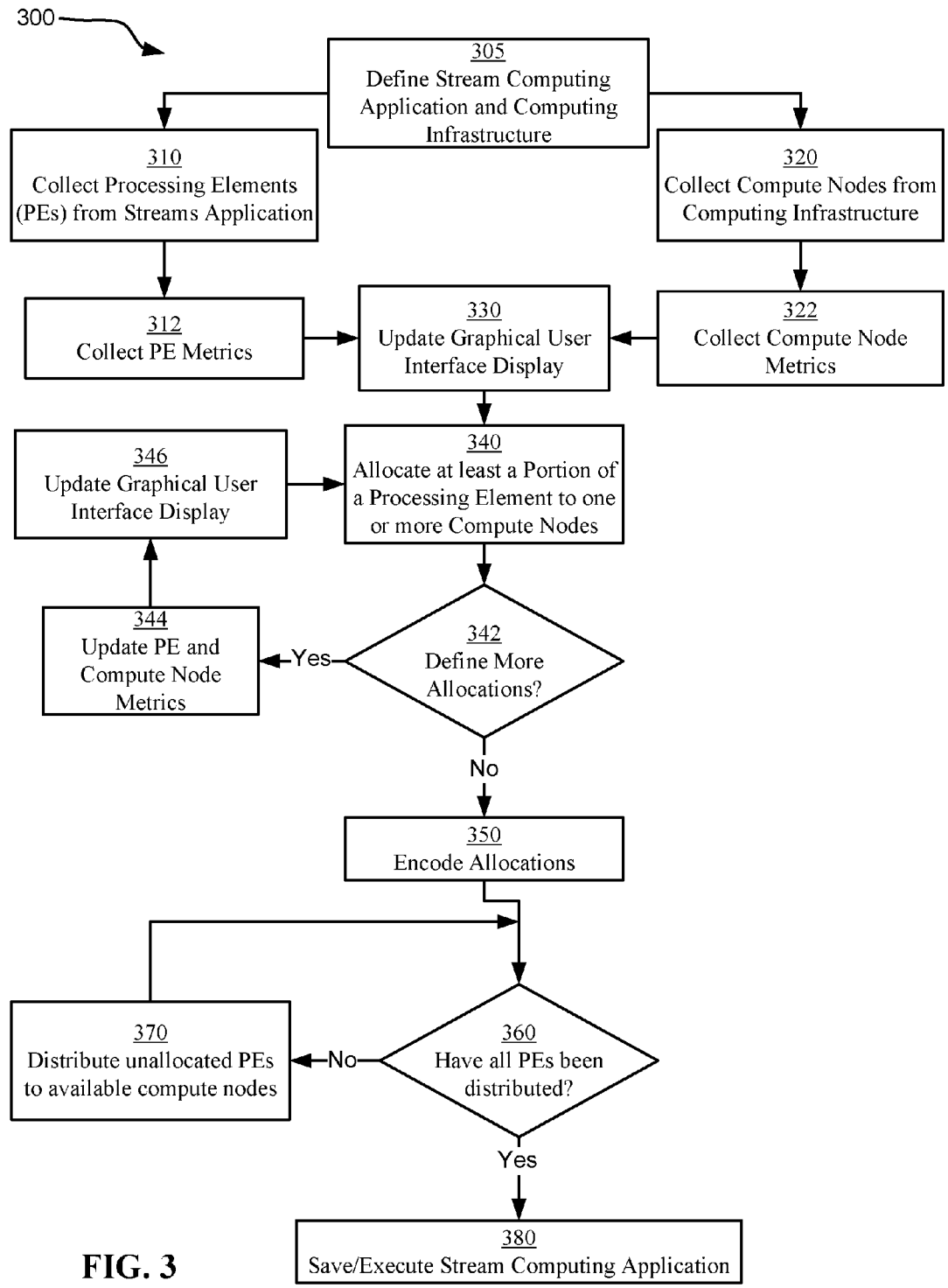
FIG. 3 illustrates a flow diagram for allocating processing elements to compute nodes according to various embodiments.

FIG. 3 illustrates a flow diagram for allocating processing elements, or portions thereof, to compute nodes. According to various embodiments, instructions for method 300 are stored in the stream manager 134, the processing element placement tool 136, or the stream computing application 232 and are executed by one or more processors 205. The method 300 starts with operation 305. Operation 305 defines the stream computing application (e.g., stream computing application 232) and the computing infrastructure (e.g., computing infrastructure 100). According to one embodiment, operation 305 occurs when a stream computing application is set for deployment. In an alternative embodiment, operation 305 is launched as part of an integrated development environment (IDE). Once the stream computing application has been defined, operation 310 collects the processing element information associated with the given stream computing application. The processing element information comprises pre-defined processing elements and stream operators stored in the stream computing application. Operation 312 collects the metrics of the stream operators and/or processing elements which are associated with the stream computing application. The processing metrics include information such as, but not limited to, input/output data (or tuple) flow rates, memory requirements, processor requirements, and historical performance. These metrics are derived from computational predictions, historical data, or a combination of both.

Operation 320 collects compute node information for a given computing infrastructure. The compute nodes can be the same or substantially the same as the compute nodes 110A-110D of FIG. 1. The compute node information can include information such as, but not limited to, the number of compute nodes and the locations of the compute nodes. Operation 322 collects compute node metrics for the respective compute nodes defined in operation 320. Operation 322 collects metrics such as, but not limited to, available memory and available processing power. According to some embodiments, operations 320 and 322 occur in parallel with operations 310 and 312.

The information collected in operations 310 through 322 is used to update a graphical user interface in operation 330. The graphical user interface includes representations of the processing elements, metrics of the processing elements, compute nodes, and metrics of the compute nodes. In some embodiments, operation 330 updates the graphical user interface to display stream operators and metrics of the respective stream operators in addition to processing elements. The graphical user interface updated in operation 330 presents the data in any manner suitable for a user as further described herein with respect to FIG. 4. In some embodiments, the information generated in operations 310 through 322 is used to construct an operator graph such as the operator graph 132 of FIG. 1 as an aspect of updating the graphical user interface in operation 330.

In operation 340 at least a portion of one or more processing elements defined in operation 310 is associated with one or more compute nodes defined in operation 320 based on user input. The user input can be received by an I/O device, such as a mouse or keyboard, which allows the user to manipulate representations of various stream computing application components presented on a graphical user interface display. The user input causes a processor (e.g., the CPU 205 of FIG. 2) to define various stream computing application rules. In some embodiments, the allocations made in operation 340 cause a processor to fuse and/or un-fuse stream operators, create processing elements, and/or associate processing elements to compute nodes. According to some embodiments, interlocks are associated with the allocation operation 340 such that any single compute node defined in operation 320 cannot be overloaded by one or more processing elements based on the metrics associated with a given set of processing elements and compute nodes. According to various embodiments, the one or more processing elements are set to be implemented by any one of a set of compute nodes based on user inputs. Alternatively, or in addition, sets of stream operators can be allowed or not allowed to be associated based on user inputs. In some further embodiments still, operators or processing elements can be permitted to, or prohibited from, executing on the same compute node based on user inputs. These various rules are established by subconfiguration statements, host tags, and/or instance tags.

A subconfiguration statement can be used to define, for example, absolute host locations, relative partition constraints, or relative host constraints. Non-limiting examples of an absolute host location are the pool, IP address, or name of the host on which the processing element will run. A relative partition constraint defines if two or more stream operators or processing elements must run in the same partition, must not run in the same partition, or must run in a partition of their own. A relative host constraint determines whether a plurality of stream operators or processing elements must run on the same host (i.e., compute node), must not run on the same host, or must only run on a host in isolation. Subconfiguration statements can be further customized by additional logic such as, for example, host tags or an instance name. A host tag identifies a set of compute nodes on which a given stream operator or processing element must run or must not run. Similarly, an instance name identifies an instance in which a stream operator or processing element must run, or must not run.

Operation 342 determines if additional allocations are to be defined. Should more allocations be defined, the system will update the processing element and compute node metrics in operation 344, update the graphical user interface display in operation 346, and return to operation 340 for additional allocations. In some embodiments, the metrics updated in operation 344 are associated with compute nodes and/or processing elements affected by a previous iteration of operation 340. Updated metrics may include, for example, the space available on a compute node recently associated with a processing element or the tuple flow rate of a newly created processing element. Thus, in some embodiments, the updated graphical user interface in operation 346 temporarily stores the various allocations and metrics prior to encoding the various allocations as described hereinafter with respect to operation 350. In the event no further allocations are to be defined, the method proceeds to operation 350.

In operation 350 the associations of processing elements to compute nodes are encoded to a computer readable storage medium containing the stream computing application information. According to some embodiments of the present disclosure, operation 350 uses subconfiguration statements, host tags, and/or instance tags as part of the encoded data.

Operation 360 verifies each processing element defined in operation 310 has been associated with a compute node defined in operation 320. In the event one or more processing elements have not been associated with one or more compute nodes, each unallocated processing element is automatically distributed to one or more compute nodes in operation 370. Operation 370 utilizes any one or any combination of methods to distribute unallocated processing elements to available compute nodes. These methods can include a relative or absolute score according to a weighted or un-weighted calculation accounting for factors such as, but not limited to, processing element criticality, stream computing application importance, and/or processor requirements. Similarly, compute nodes identified as candidates to receive an unallocated processing element can be compared using factors such as, but not limited to, unused space and processor capability. Collectively, this information can be used by the management system 105 or the development system 102 to automatically allocate any unallocated processing elements to available compute nodes in operation 370.

Following operation 370, all processing elements for the stream computing application are associated with one or more compute nodes in a given computing infrastructure. Operation 380, the final operation, executes the stream computing application, saves the stream computing application, or both.

Figure 4:
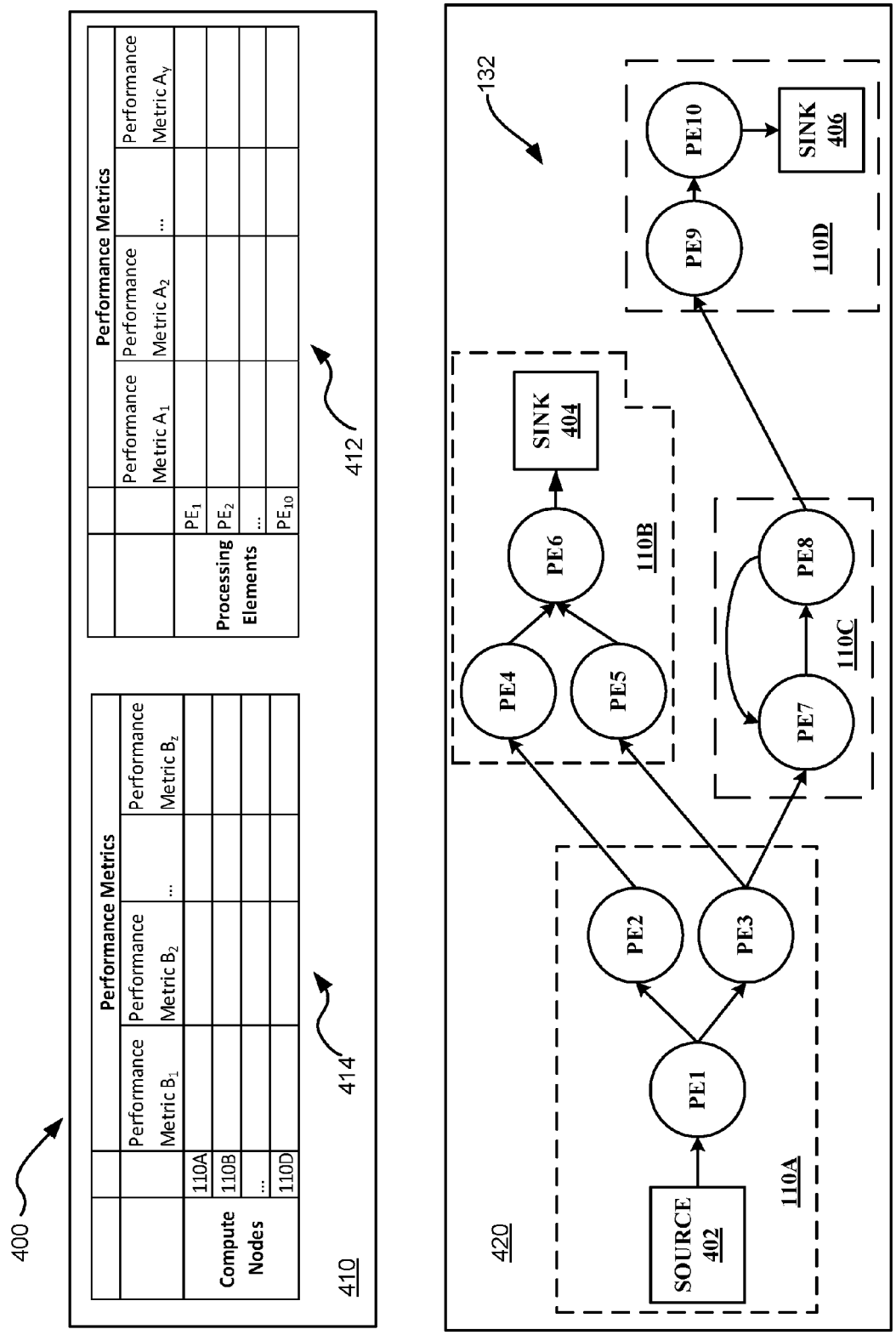
FIG. 4 illustrates a graphical user interface according to various embodiments.

Referring now to FIG. 4, shown is a block diagram of a graphical user interface according to some embodiments of the present disclosure. According to various embodiments, the graphical user interface 400 is displayed on one or more I/O devices (e.g., I/O devices 212) which are generated by one or more processors (e.g., processors 205) executing instructions contained in a stream manager or stream computing application (e.g., stream manager 134 or stream computing application 232).

A user presented with graphical display 400 can monitor a stream computing application. The graphical display 400 can receive user input which is used by a processor to allocate various processing elements to various compute nodes. In some embodiments, a processor allocates, un-allocates, fuses, un-fuses, or otherwise modifies the processing elements and stream operators running on the compute nodes 110A-110D based on user inputs received from the graphical user interface. In some additional embodiments, a processor makes automatic modifications to the stream computing application in addition to modifications based on user inputs (e.g., automatic allocations as described in operation 370 of FIG. 3).

The graphical user interface 400 includes, individually or in combination, a tabulated display 410, a graphical display 420, or any other representation suitable to a user. A tabulated display 410 provides processing element data 412 and compute node data 414. The processing element data 412 is displayed to include some or all processing elements used in a given stream computing application. According to some embodiments, each displayed processing element is associated with at least one performance metric. For example, processing element table 412 contains performance metrics $A_1$ through $A_y$ (where subscript "y" represents a variable number of performance metrics) which can be associated with each processing element PE1-PE10. Exemplary, non-limiting performance metrics for processing elements are data (tuple) flow rates, required processing power, and historical performance. In an alternative embodiment, the stream operators (e.g., stream operators 112) and associated performance metrics are shown in addition to the processing elements $PE_1$-$PE_{10}$ in the table 412. Alternatively, the stream operators and associated performance metrics can be shown exclusively in table 412 where no processing elements have been defined for a given stream computing application.

The compute node table 414 similarly accounts for some or all compute nodes in a given computing infrastructure. The compute nodes 110A-110D can be associated with at least one performance metric, though several performance metrics $B_1$ through $B_z$ are contemplated (where subscript "z" represents a variable number of performance metrics). Exemplary, non-limiting compute node performance metrics are generally associated with aspects of processor capability and memory availability.

Further aspects of the present disclosure allow for each performance metric for each processing element and compute node to be updated as processing elements or portions thereof are allocated to compute nodes. For example, the available space on a compute node will decrease as one or more processing elements or portions thereof are associated with that compute node Likewise, the data flow rate of a given processing element will change as individual stream operators are fused or un-fused from said processing element.

The graphical display 420 includes an operator graph 132 containing processing elements and compute nodes and the relationships between those processing elements and compute nodes for a given stream computing application. The operator graph 132 is configured to show one or more performance metrics $A_1$ through $A_y$ associated with each processing element and one or more performance metrics $B_1$ through $B_z$ associated with each compute node. According to various embodiments of the present disclosure, the performance metrics are displayed constantly or the performance metrics are displayed in response to a user action (e.g., clicking an icon). According to some embodiments, the performance metrics are a number, a percentage, or an infographic (e.g., a pie graph). For example, a performance metric may be the available memory for a given compute node. This exemplary performance metric can be displayed as an absolute value (e.g., bytes), a percentage (e.g., percentage of free memory compared to all memory), or graphically (e.g., a pie graph showing the relative proportions of available and unavailable memory or storage). Alternatively, the performance metric is displayed by the organization of the compute nodes (e.g., ordered from most to least available space). Although the processing elements are shown via circles and the compute nodes are shown via dashed boxes, numerous shapes and graphics representing respective processing elements, compute nodes, and the relationships between said processing elements and compute nodes are contemplated.

Graphical display 420 includes an exemplary operator graph 132 for a stream computing application beginning from one or more sources 402 through to one or more sinks 404, 406, according to some embodiments. This flow from source to sink is also generally referred to herein as an execution path. In addition, a flow from one processing element to another is referred to as an execution path in various contexts. Although graphical display 420 is abstracted to show connected processing elements PE1-PE10, the operator graph 132 can also include data flows between stream operators (e.g., stream operators 112 from FIG. 1) within the same or different processing elements. While the operator graph 132 includes a relatively small number of components, an operator graph can be more complex and include many individual operator graphs that are statically or dynamically linked together.

The example operator graph shown in graphical display 420 includes ten processing elements (labeled as PE1-PE10) running on the compute nodes 110A-110D. A processing element includes one or more stream operators fused together to form an independently running process with its own process ID (PID) and memory space. In cases where two (or more) processing elements are running independently, inter-process communication can occur using a "transport" (e.g., a network socket, a TCP/IP socket, or shared memory). Inter-process communication paths used for inter-process communications are a resource in a stream computing application. However, when stream operators are fused together, the fused stream operators can use more rapid communication techniques for passing tuples among stream operators in each processing element.

The operator graph 132 begins at a source 402 and ends at a sink 404, 406. Compute node 110A includes the processing elements PE1, PE2, and PE3. Tuples from source 402 flow into the processing element PE1, which in turn outputs tuples that are received by PE2 and PE3. For example, PE1 can split data attributes received in a tuple and pass some data attributes in a new tuple to PE2, while passing other data attributes in another new tuple to PE3. As a second example, PE1 can pass some received tuples to PE2 while passing other tuples to PE3. Tuples that flow to PE2 are processed by the stream operators contained in PE2, and the resulting tuples are then output to PE4 on compute node 110B Likewise, the tuples output by PE4 flow to operator sink PE6 404. Similarly, tuples flowing from PE3 to PE5 also reach the operators in sink PE6 404. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 406.

Because a processing element can be a collection of fused stream operators, it is equally correct to describe the operator graph as one or more execution paths between specific stream operators, which can include execution paths to different stream operators within the same processing element. Operator graph 132 shown in graphical display 420 illustrates execution paths between processing elements for the sake of clarity.

Thus, the graphical user interface 400 can present both a tabulated display 410 and a graphical display 420 of a given stream computing application and computing infrastructure. A further aspect of the present disclosure involves user-interaction with the graphical user interface 400. The various processing elements PE1 through PE10 can be associated with the various compute nodes 110A through 110D based on user inputs. According to an embodiment, processing element rows or icons can be associated with compute node rows or icons based on information received by the graphical user interface. According to an additional embodiment, various stream operators can be fused and un-fused within a processing element and distributed across one or more compute nodes based on information received by the graphical user interface. According to a further embodiment still, one or more stream operators and/or processing elements can be executed by any one, or any combination of, a set of compute nodes based on input received by the graphical user interface. In various embodiments, additional information regarding the execution of a stream computing application such as which stream operators can, or cannot, be fused into a processing element, and which stream operators and/or processing elements can, or cannot, run on the same compute node can be defined based on information received from the graphical user interface. These various rules can be implemented by a processor using subconfiguration statements as previously described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for managing a deployment of a stream computing application in a computing infrastructure comprising:

a memory and a processor configured to perform a method comprising:

generating a graphical user interface display presenting the stream computing application and the computing infrastructure, wherein the stream computing application comprises one or more processing elements, wherein each processing element comprises one or more stream operators, wherein the computing infrastructure comprises one or more compute nodes, wherein the graphical user interface is deployed from an integrated development environment (IDE);

displaying a respective metric for each presented stream operator;

displaying a respective metric for each presented processing element;

displaying a respective metric for each presented compute node;

allocating at least a portion of a processing element to at least one compute node, each allocation using input received from the graphical user interface;

updating, in response to each respective allocation, the graphical user interface display to execute the at least a portion of a processing element on the at least one compute node;

updating, in response to each respective allocation, each respective metric for each presented stream operator, each respective metric for each presented processing element, and each respective metric for each presented compute node;

identifying unallocated processing elements or portions thereof;

allocating the identified unallocated processing elements or portions thereof to one or more compute nodes according to a predefined protocol;

encoding each respective allocation onto at least one computer readable storage medium, wherein encoding each respective allocation comprises at least one subconfiguration statement, wherein the at least one subconfiguration statement comprises a relative partition constraint, wherein the relative partition constraint defines if a set of processing elements executes on a same partition, executes on different partitions, or executes on a partition in isolation;

metering the use of the graphical user interface display; and generating an invoice based on the metered use.

* * * * *